(12) United States Patent
Haishi (10) Patent No.: US 6,208,814 B1
(45) Date of Patent: Mar. 27, 2001

(54) PRE-EXPOSING METHOD FOR A PHOTOGRAPHIC FILM AND MANUFACTURING METHOD FOR A LENS-FITTED FILM UNIT

(75) Inventor: Akira Haishi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/213,439

(22) Filed: Dec. 17, 1998

(30) Foreign Application Priority Data

Dec. 18, 1997 (JP) .................................................. 9-348993

(51) Int. Cl.$^7$ .............................. G03B 41/00; G03B 29/00
(52) U.S. Cl. ............................ 396/332; 396/333; 396/429
(58) Field of Search ........................................ 396/322, 332, 396/333, 334, 335, 337, 429

(56) References Cited

U.S. PATENT DOCUMENTS

| | | | |
|---|---|---|---|
| 5,111,224 | * 5/1992 | Spector | 396/316 |
| 5,187,512 | 2/1993 | Kirkendall | 396/340 |
| 5,343,265 | * 8/1994 | Oi et al. | 396/378 |
| 5,546,146 | 8/1996 | Dobbs et al. | 396/6 |
| 5,758,216 | * 5/1998 | Arnold | 396/311 |
| 5,835,795 | 11/1998 | Craig et al. | 396/6 |

* cited by examiner

Primary Examiner—David M. Gray
(74) Attorney, Agent, or Firm—Young & Thompson (57) ABSTRACT

A lens-fitted film unit is loaded with a photographic film for which pre-exposure is performed in advance. When the pre-exposure is performed for the photographic film, the photographic film is advanced out of a cartridge shell. The advanced photographic film is pre-exposed every five frames. By performing the pre-exposure for the plural frames at the same time, a process speed of the pre-exposure becomes fast in comparison with a conventional speed. The pre-exposed photographic film is rolled, and is contained in the lens-fitted film unit together with the cartridge shell. As the process speed of the pre-exposure is improved, manufacturing efficiency of the lens-fitted film unit is also improved.

19 Claims, 6 Drawing Sheets

PRE-EXPOSING METHOD FOR A PHOTOGRAPHIC FILM AND MANUFACTURING METHOD FOR A LENS-FITTED FILM UNIT

BACKGROUND OF THE INVENTION

1. Field of the Invention

The present invention relates to a pre-exposing method for a photographic film, and to a manufacturing method for a lens-fitted film unit.

2. Description of the Related Art

There is a lens-fitted film unit as a kind of a camera. In the lens-fitted film unit, a simple photographing mechanism is included. This lens-fitted film unit is loaded with a photographic film and a film cartridge shell in advance. Such lens-fitted film unit is manufactured and merchandised by the assignee of the present application. Some of the lens-fitted film unit are loaded with a photographic film in which predetermined images are beforehand photographed by a pre-exposure. This pre-exposure is performed for a few frames of the photographic film, or for a part of the frame.

U.S. Pat. No. 5,546,146 discloses a pre-exposing method for performing a pre-exposure on a photographic film before the lens-fitted film unit is loaded with it. In this method, prior to loading the lens-fitted film unit, the photographic film is advanced frame by frame, and during the advancement, the pre-exposure is performed. After that, the lens-fitted film unit is loaded with the pre-exposed photographic film.

However, in the above-stated method, a process speed of the pre-exposure is slow. Thus, there arises a problem in that manufacturing efficiency of the lens-fitted film unit worsens because the lens-fitted film unit is loaded with the photographic film which is pre-exposed at slow speed.

SUMMARY OF THE INVENTION

In view of the foregoing, it is a primary object of the present invention to provide a pre-exposing method for a photographic film in which the pre-exposure is efficiently performed.

It is a second object of the present invention to provide a manufacturing method for a lens-fitted film unit in which manufacturing efficiency of the lens-fitted film unit is improved by efficiently performing the pre-exposure for a photographic film.

In order to achieve the above and other objects, the pre-exposing method for the photographic film and the manufacturing method for the lens-fitted film unit comprise a step of performing the pre-exposure every plural frames of the photographic film. In a preferred embodiment, the pre-exposure is performed every five frames.

When the pre-exposure is performed for the photographic film, the photographic film is advanced out of a cartridge shell. The advanced photographic film is pre-exposed every five frames. By performing the pre-exposure for the plural frames at the same time, a process speed of the pre-exposure becomes fast in comparison with that of a conventional method in which the pre-exposure is performed one frame by one frame.

The pre-exposed photographic film is rolled as a film roll, and is contained in the lens-fitted film unit together with the cartridge shell. At this time, the film roll is contained in a film roll chamber, and the cartridge shell is contained in the cartridge chamber.

The process speed of the pre-exposure is improved so as to be fast. Accordingly, manufacturing efficiency of the lens-fitted film unit is also improved.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 2:
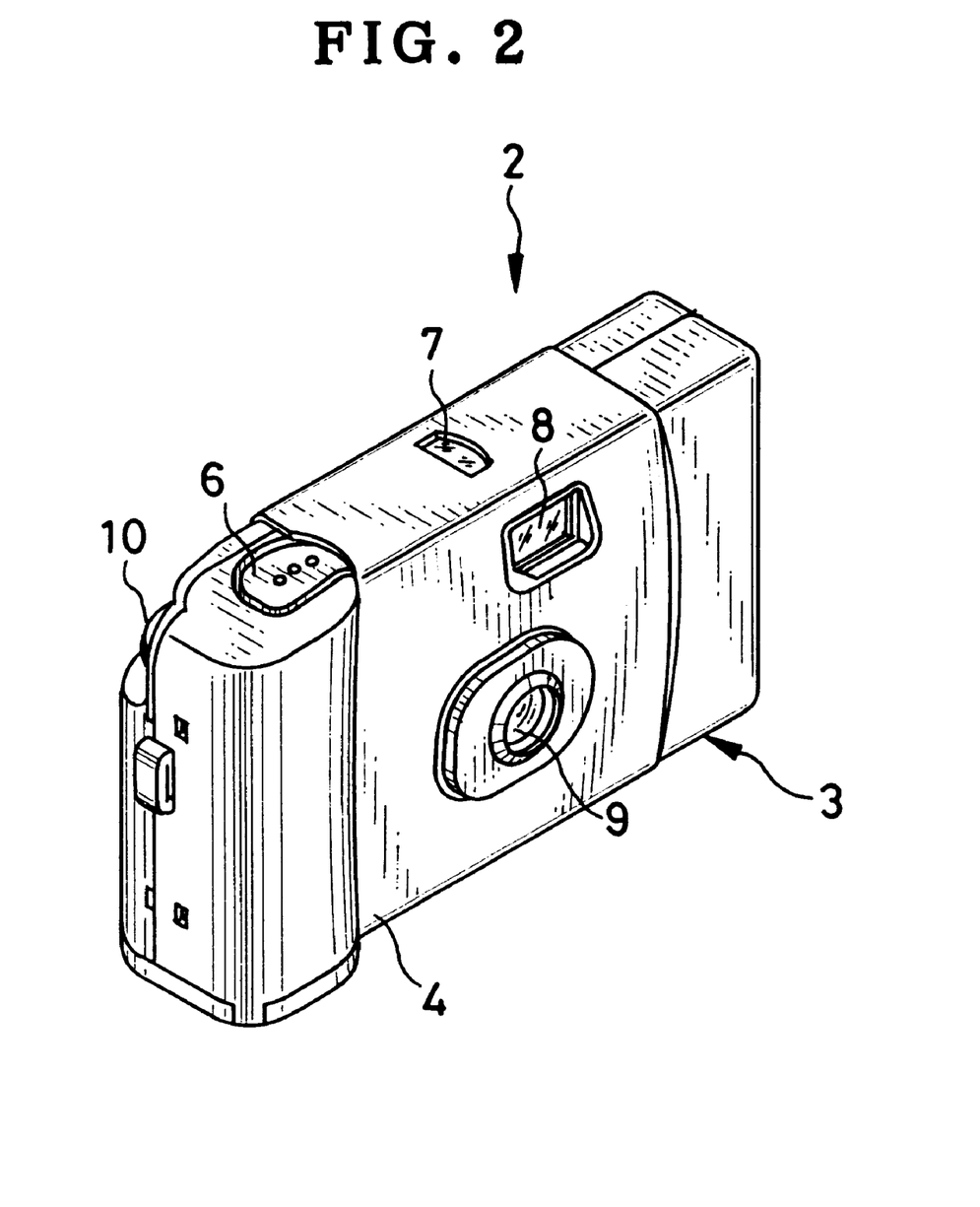
FIG. 2 is a perspective view showing an appearance of a lens-fitted film unit.

Referring the accompanying drawings, a preferred embodiment according to the present invention is described below. As shown in FIG. 2, a lens-fitted film unit 2 is loaded with a film cartridge in advance, and is constituted of a unit body 3 and a label 4. The unit body 3 includes various photographing mechanisms. The label 4 covers the unit body 3 partially.

On an upper face of the unit body 3, a shutter button 6 and a counter window 7 are provided. The counter window 7 is for indicating a photographable number of remaining frames. On a front face of the unit body 3, a viewfinder 8, a taking lens 9 and so forth are provided. From a rear face of the unit body 3, a winding knob 10 emerges. The winding knob 10 is rotated every one-frame photographing. On the unit body 3, the label 4 is stuck so as to wrap a center portion thereof. The label 4 is formed with openings for baring the taking lens 9, the viewfinder 8, the counter window 7, and so forth. Further, on the label 4, a using method of the lens-fitted film unit 2 and an explanation regarding its feature are written.

Figure 3:
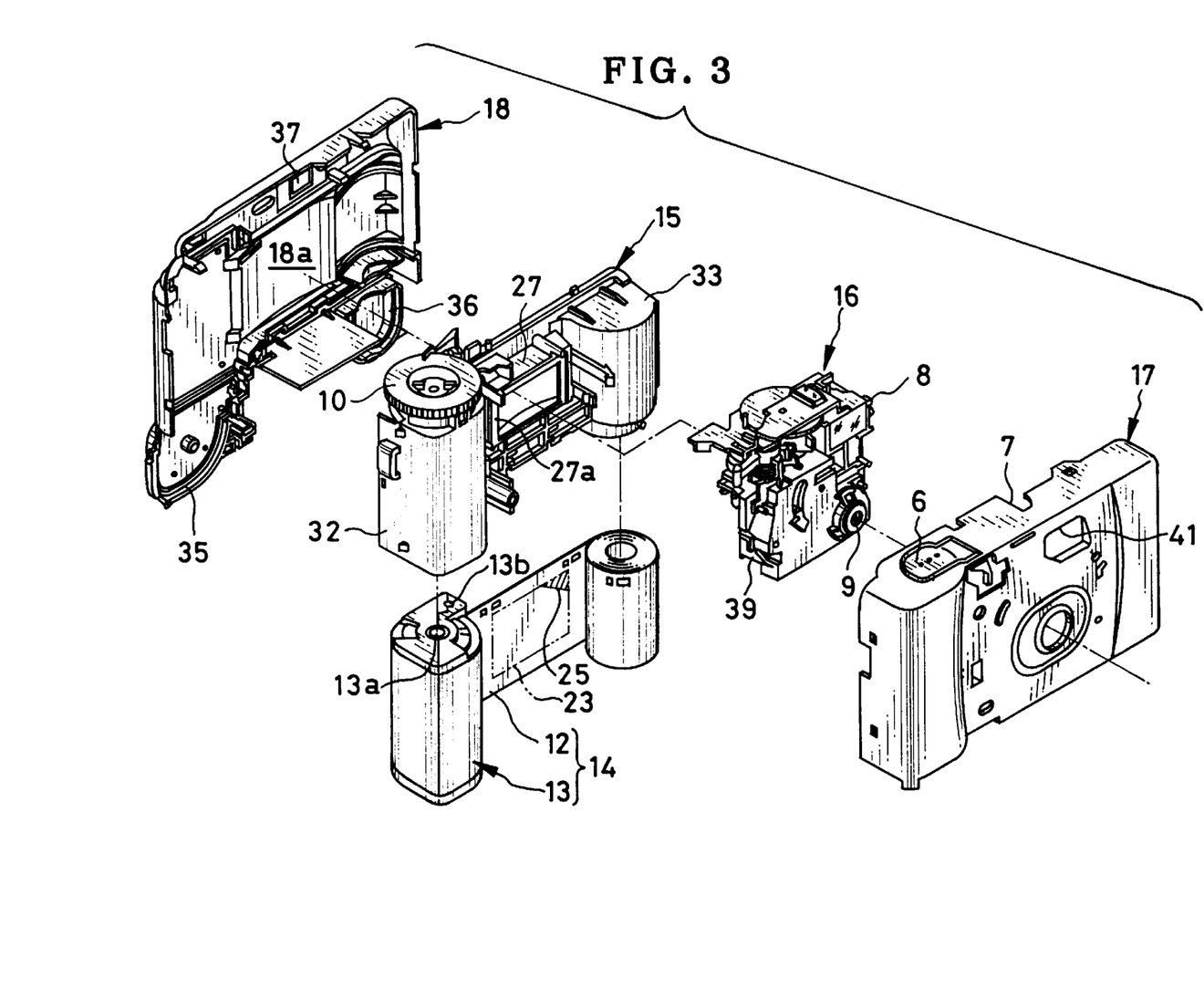
FIG. 3 is an exploded perspective view showing structure of a unit body.

As shown in FIG. 3, the unit body 3 is constituted of a main body 15, an exposure unit 16, a front cover 17, and a rear cover 18 which are assembled by means of claws. The main body 15 is loaded with a film cartridge 14 which includes a photographic film 12 and a cylindrical-shaped cartridge shell 13. The exposure unit 16 is attached to the front of the main body 15. The front cover 17 and the rear cover 18 are respectively attached to the front and the rear of the main body 15 so as to cover them.

The cartridge shell 13 is formed such as to connect plastic case members. Inside the cartridge shell 13, a spool 13a on which the photographic film 12 is wound is rotatably contained. A film mouth 20 (refer to FIG. 1) for advancing the photographic film 12 is formed at a mating portion of the case members. A light-shielding lid 13b for opening and closing the film mouth 20 is rotatably attached to the cartridge shell 13. As to the film cartridge 14, the photographic film 12 is advanced through the film mouth 20 by rotating the spool 13a of the cartridge shell 13.

Figure 4:
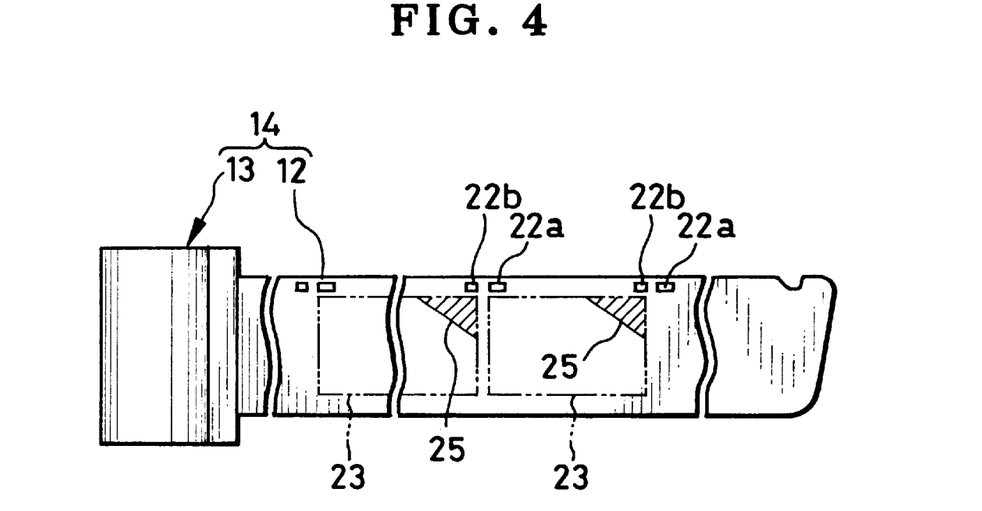
FIG. 4 is a front view of a photographic film for which a pre-exposure is performed.

Perforations 22a and 22b of two kinds are formed in one side of the photographic film 12. The perforation 22a has a larger size, and the perforation 22b has a smaller size. The perforations 22a and 22b are alternately arranged in a longer interval and a shorter interval. Within the longer interval of the perforations 22a and 22b, a frame 23 for photographing is provided. Distance between the frames is determined in accordance with the shorter interval of the perforations 22a and 22b. Moreover, as shown in FIG. 4, a pre-exposure image 25 is pre-exposed at a corner of each frame 23 of the photographic film 12. The pre-exposure image is a letter, a mark or the like. The pre-exposure for the frame 23 is performed before containing the photographic film 12 in the lens-fitted film unit 2.

Figure 5:
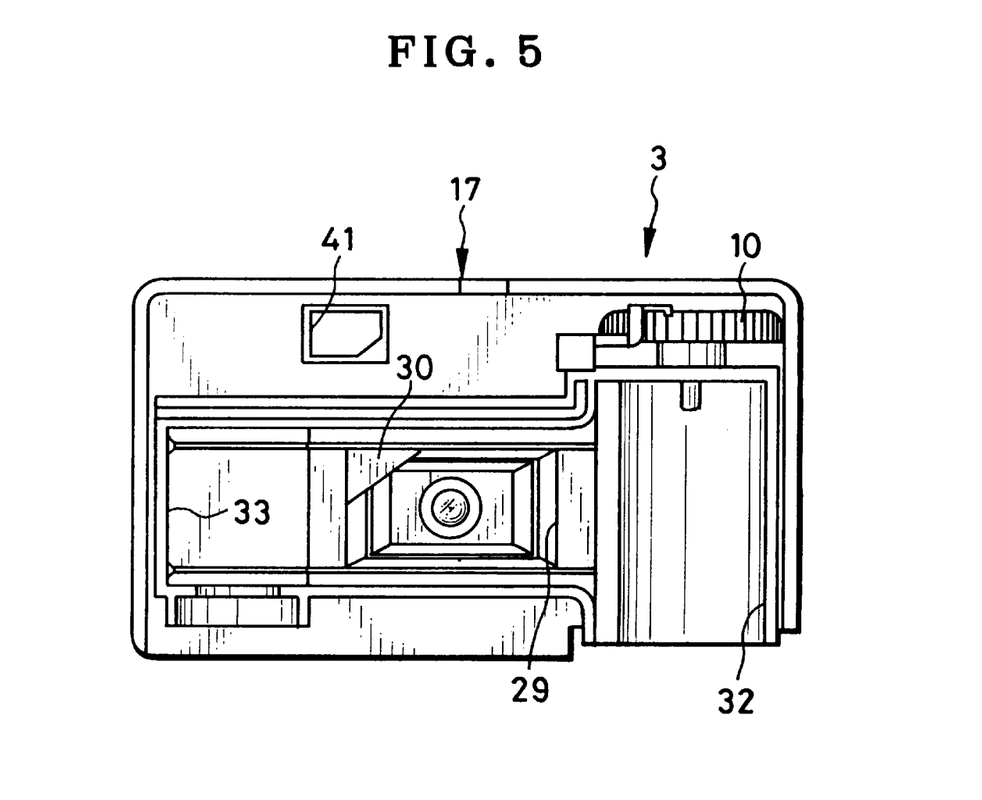
FIG. 5 is a rear view of a main body and a front cover of the lens-fitted film unit.

A center portion of the main body 15 is provided with a light-shielding wall 27 for optically shielding an optical path positioned between the exposure unit 16 and the photographic film 12. At a front side of the light-shielding wall 27, an opening 27a is formed. At a rear side of the light-shielding wall 27, an exposure aperture 29 for defining an exposure area of the photographic film 12 is formed as shown in FIG. 5. The exposure aperture 29 is provided with a screen 30 so as not to perform a double exposure for the pre-exposure image 25 which is pre-exposed in the photographic film 12. In other words, the screen 30 is disposed so as to cover the pre-exposure image 25 of the photographic film 12.

At both sides of the light-shielding wall 27 of the main body 15, a cartridge chamber 32 and a film roll chamber 33 are respectively disposed. These chambers 32 and 33 are integrally formed with each other. In a manufacturing process, the cartridge shell 13 is contained in the cartridge chamber 32, and the photographic film 12 drawn out of the cartridge shell 13 and wound in a roll form is contained in the film roll chamber 33. On the other hand, the winding knob 10 is rotatably attached to an above portion of the cartridge chamber 32. An engaging shaft formed on a lower face of the winding knob 10 engages with the end of the spool 13a contained in the cartridge shell 13. Further, at the upper face of the cartridge chamber 32 and the lateral side thereof, a mechanism for closing the light-shielding lid 13b is provided, although it is not shown in the drawing. This mechanism is for closing the light-shielding lid 13b when the film cartridge 14 is taken out from the lens-fitted film unit 2.

The rear cover 18 is attached to the rear side of the main body 15 to light-tightly shield the main body 15. The attached rear cover 18 supports the rear face of the photographic film 12 contained in the main body 15. At this time, the rear cover 18 supports it with a supporting face 18a provided at a front center portion of the rear cover 18. At a lower portion of the rear cover 18, bottom lids 35 and 36 are integrally formed therewith. The bottom lids 35 and 36 respectively shield the lower portions of the cartridge chamber 32 and the film roll chamber 33. In this embodiment, the bottom lids 35 and 36 are respectively connected to the rear cover 18 via a bendable section having a thin thickness. The bottom lid 35 is opened when the film cartridge 14 is taken out after the lens-fitted film unit 2 has been used. By the way, at an above portion of the supporting face 18a, an eye-side viewfinder window 37 constituting the viewfinder 8 is formed.

The exposure unit 16 includes a base member 39 made of a plastic and having a block-like shape. The base member 39 has the taking lens 9, an objective lens and an eyepiece constituting the viewfinder 8. Besides these, a shutter mechanism, a film stopping mechanism, a film counting mechanism, and so forth are mounted on the base member 39 as a single unit.

The front cover 17 is attached to the front of the main body 15 so as to cover the front face, the upper face, and the side face of the main body 15. The front cover 17 is formed with the shutter button 6 and the counter window 7. Besides these, for example, a subject-side viewfinder window 41 constituting the viewfinder 8 is formed. By the way, the viewfinder window 41 has a similar figure to the exposure aperture 29 provided with the screen 30. According to this, it is possible to notify the photographer of the information that a photograph is not taken relative to the portion of the pre-exposure image 25. The pre-exposure image 25 is photographed in the frame 23 of the photographic film 12 in advance.

Figure 6:
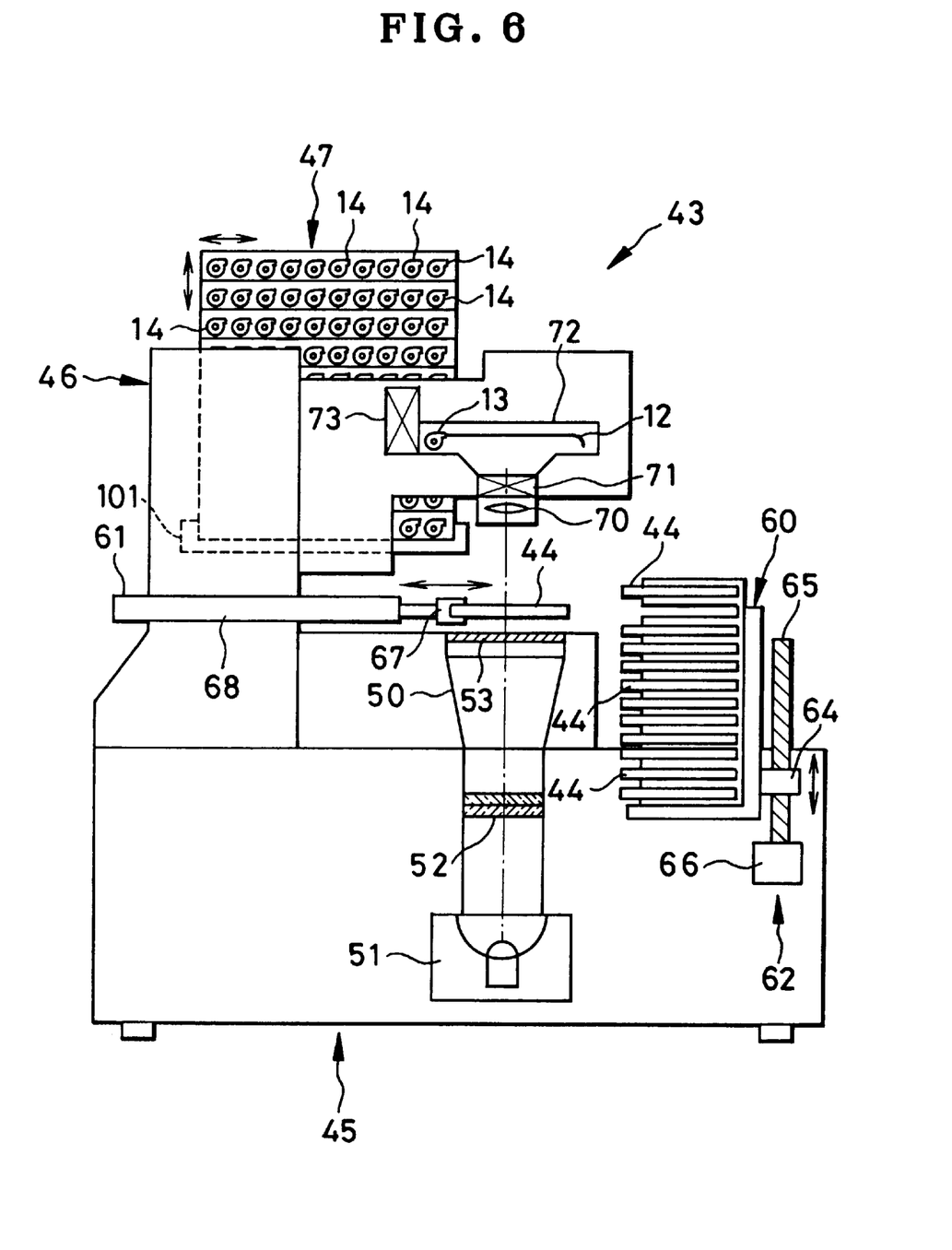
FIG. 6 is a schematic illustration showing the pre-exposing apparatus in which the pre-exposing method according to the present invention is used.

FIG. 6 schematically shows the structure of a pre-exposing apparatus 43 in which an image of a diapositive 44 is photographed to the photographic film 12. After photographing the image, the photographic film 12 is contained in the lens-fitted film unit. This diapositive is prepared in advance. The pre-exposing apparatus 43 comprises a base section 45, an exposure section 46, and a cartridge magazine 47. The base section 45 projects the image of the diapositive 44 to the photographic film 12. The exposure section 46 is disposed on the base section 45, and exposes the photographic film 12 to the image of the diapositive projected from the base section 45. The cartridge magazine 47 supplies the film cartridge 14 to the exposure section 46.

The diapositive 44 is set above the base section 45. Under the diapositive 44 having been set, a light-shielding cylinder 50 for projecting a light is provided in a vertical direction. The light-shielding cylinder 50 shields the projection light so as not to escape from its inside. The light-shielding cylinder 50 has a lighting unit 51, a interference filter 52, and a diffusion plate 53 which are attached to the inside of the cylinder 50 and are arranged in order from the bottom thereof.

Figure 1:
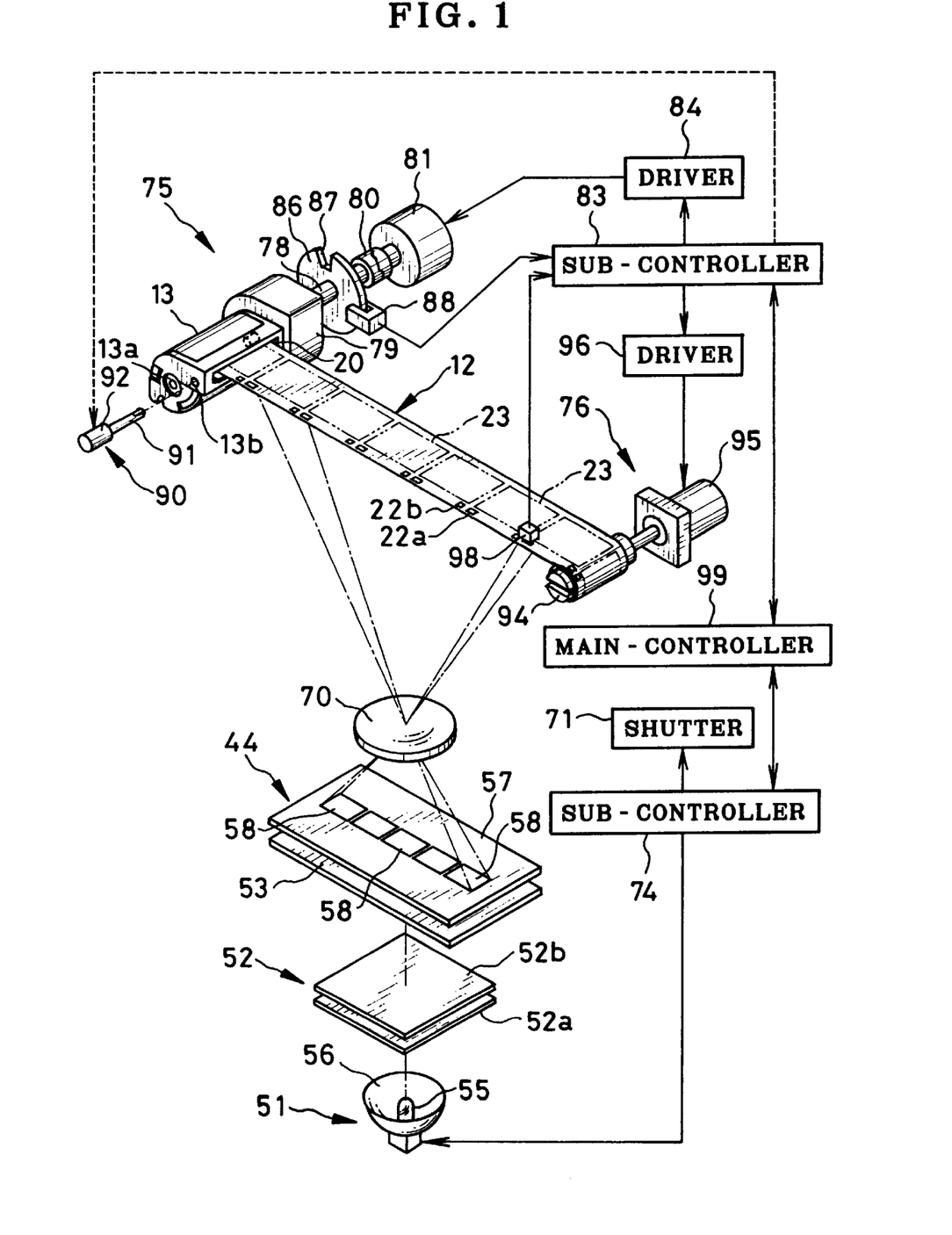
FIG. 1 is an exploded perspective view showing a pre-exposing apparatus in which a pre-exposing method according to the present invention is used.

As shown in FIG. 1, the lighting unit 51 comprises a halogen lamp 55 and a reflector 56. The lighting unit 51 illuminates the diapositive 44 from the under side thereof. The interference filter 52 comprises two filters 52a and 52b (for example, a green filter and a red filter) whose wavelength ranges are different. The light radiated from the lighting unit 51 is selectively transmitted by the interference filter 52. In other words, the interference filter 52 transmits the light having the suitable wavelength range relative to the pre-exposure. The diffusion plate 53 diffuses the light radiated from the lighting unit 51 to illuminate the diapositive 44 uniformly. In this embodiment, the diapositive 44 is formed such that a plurality of, for example, five positive films 58 are supported by a supporting plate 57. This supporting plate 57 acts as a carrier plate of the positive films 58, and is made of a paper, a plastic and so forth. The positive film 58 has a small size, and corresponds to the frame of the photographic film one by one. Alternatively, one positive film may be supported by the supporting plate 57. In this case, the positive film has the images corresponding to the plural frames.

The base section 45 is provided with a diapositive holder 60, a diapositive setting unit 61, and a holder moving unit 62. The diapositive holder 60 holds a plurality of the diapositives 44. The diapositive setting unit 61 takes the selected diapositive 44 out of the diapositive holder 60 to set it above the light-shielding cylinder 50. The holder moving unit 62 moves the diapositive holder 60 in an up-and-down direction so that the diapositive setting unit 61 can take out any of the diapositives 44 held in the holder 60.

In this embodiment, the holder moving unit 62 comprises a female ball thread 64 attached to the diapositive holder 60, a male ball thread 65 meshing with the female ball thread 64, and a motor 66 for rotating the male ball thread 65. The diapositive holder 60 is moved in the up-and-down direction by driving the motor 66. The diapositive setting unit 61 comprises an arm 67 and a driving unit 68. The arm 67 takes the diapositive 44 out of the holder 60, and returns the diapositive 44 to the holder 60 after using it. The driving unit 68 moves the arm 67 between the holder 60 and the position where the diapositive 44 is set. Incidentally, an air cylinder, a cam mechanism, and so forth are used as the driving unit 68.

The exposure section 46 is provided with a magnifying lens 70, a shutter 71, an exposure chamber 72, and a cartridge supplier 73. The magnifying lens 70 is disposed above the light-shielding cylinder 50 in order to expand the projection light radiated from the base section 45. The shutter 71 adjusts an exposure amount to the photographic film 12. The exposure chamber 72 is for setting the film cartridge 14 therein. The cartridge supplier 73 supplies the film cartridge 14 to the exposure chamber 72.

The shutter 71 comprises an electronic shutter having a diaphragm mechanism. Opening and closing of the shutter 71 is controlled by a sub-controller 74 shown in FIG. 1. When the shutter 71 is closed, the projection light of the diapositive 44 having passed through the magnifying lens 70 is shut out so as not to enter the exposure chamber 72. When the shutter 71 is opened, the projection light of the diapositive 44 having passed through the magnifying lens 70 enters the exposure chamber 72. The photographic film 12 is advanced from the cartridge shell 13 in the exposure chamber 72 so that the exposure chamber 72 is light-tightly shielded. By the way, the sub-controller 74 also controls the halogen lamp 55 of the lighting unit 51 attached to the base section 45.

As shown in FIG. 1, inside the exposure chamber 72, a film supplier 75 and a film winder 76 are attached. The film supplier 75 holds the film cartridge 14 supplied from the cartridge supplier 73, and advances the photographic film 12 out of the cartridge shell 13. The film winder 76 winds up the photographic film 12 advanced by the film supplier 75.

The film supplier 75 comprises a cartridge holder 79 and a motor 81. The cartridge holder 79 includes a cartridge holding mechanism for holding the film cartridge 14 by means of air suction and so forth, and a drive shaft 78 for engaging with the end of the spool 13a to rotate it. The motor 81 gives a driving force to the drive shaft 78 of the cartridge holder 79 via a clutch 80.

A sub-controller 83 controls the motor 81 via a driver 84. The clutch 80 transmits the rotation of the motor 81 to the drive shaft 78 when the motor 81 is driven in a film advancing direction or in a film rewinding direction. While the motor 81 is driven in the film advancing direction, the photographic film 12 is advanced out of the cartridge shell 13. While the motor 81 is driven in the film rewinding direction, the photographic film 12 is rewound into the cartridge shell 13. On the other hand, when the photographic film 12 is wound up by the film winder 76, the clutch 80 slips to cut off the connection between the motor 81 and the drive shaft 78.

The drive shaft 78 is provided with a disk 86 integrally rotated therewith, and a photo sensor 88 for sensing a revolution number of the disk 86 by detecting a notch 87 formed in the disk 86. A detection signal of the photo sensor 88 is inputted to the sub-controller 83 to be counted.

A lid operating member 90 for opening and closing the light-shielding lid 13b of the film cartridge 14 is disposed so as to face the cartridge holder 79. The lid operating member 90 is constituted of an engaging pin 91 and a rotary solenoid 92. The engaging pin 91 engages with the end portion of the light-shielding lid 13a of the film cartridge 14 which is held by the cartridge holder 79. The rotary solenoid 92 rotates the engaging pin 91 in an opening direction of the light-shielding lid 13b. The rotary solenoid 92 is usually urged in a closing direction of the light-shielding lid 13b by means of a spring which is not shown. When the rotary solenoid 92 is driven by the sub-controller 83, the rotary solenoid 92 is rotated in the opening direction of the light-shielding lid 13b.

The film winder 76 comprises a film winding shaft 94 formed with a slit into which a leader of the photographic film 12 is inserted, and a motor 95 for rotating the film winding shaft 94 in a film winding direction. The sub-controller 83 drives the motor 95 via a driver 96.

Between the film supplier 75 and the film winder 76, a reflection-type photo sensor 98 is disposed. The photo sensor 98 is for detecting the perforation 22a of the photographic film 12. A detection signal from the photo sensor 98 is inputted to the sub-controller 83. The sub-controllers 74 and 83 are controlled by a main-controller 99 incorporating a CPU, a ROM in which a control program is stored, and so forth.

The cartridge magazine 47 contains the film cartridges 14 which are manufactured in its manufacturing line and have passed various tests. The film cartridges 14 are contained in the cartridge magazine 47 such as to be arranged in a fixed posture. The cartridge magazine 47 is supported by a movable tray 101 which is attached to the exposure section 46 so as to be movable in its length direction and in its width direction. The movable tray 101 is moved by a motor, a gear mechanism, an air cylinder, and so forth which are not shown. By moving the tray 101, the cartridge magazine 47 is moved in a perpendicular direction and in a parallel direction relative to the cartridge supplier 73. The cartridge supplier 73 draws the film cartridge 14 out of the cartridge magazine 47 one by one, and sets it to the film supplier 75 disposed in the exposure chamber 72. By the way, the cartridge magazine 47 is also used as a container magazine of the film cartridges 14 after the pre-exposure has been over.

Figure 7:
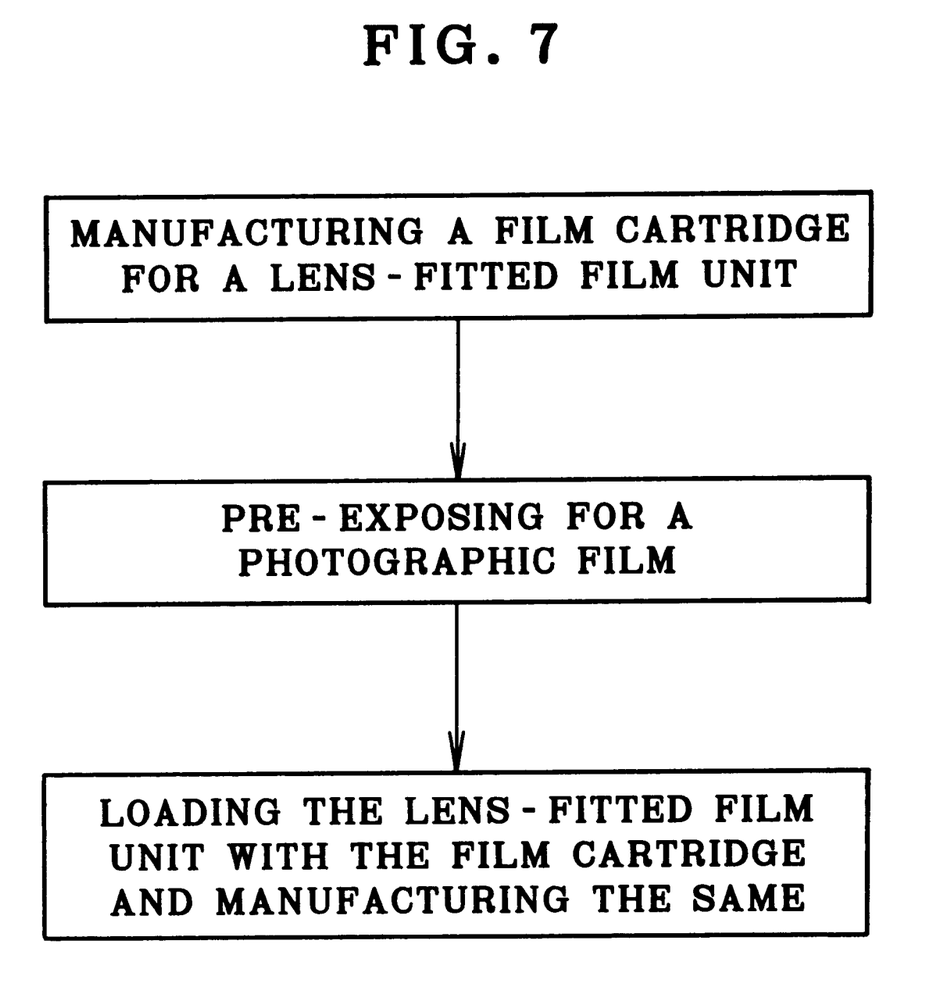
FIG. 7 is a flow chart showing a manufacturing method of the lens-fitted film unit according to the present invention.

Referring to a flow chart shown in FIG. 7, an operation of the above-mentioned embodiment is described. The film cartridge 14 used for the lens-fitted film unit is manufactured such that the film cartridge for a general camera is processed so as to change a perforation size of the photographic film 12, for example. After manufacturing, various tests are carried out for the film cartridge 14. The film cartridge 14 having passed the various tests is contained in the cartridge magazine 47 shown in FIG. 6, and is supplied to the pre-exposing apparatus 43 as described below.

The cartridge magazine 47 containing the film cartridges 14 is attached to the movable tray 101 which is provided on the exposure section 46. The movable tray 101 moves the cartridge magazine 47 in its length direction and its width direction. On that way, the cartridge supplier 73 draws out the film cartridge 14 to supply it to the exposure chamber 72.

When the film cartridge 14 is supplied to the exposure chamber 72, at the same time, the arm 67 constituting the diapositive setting unit 61 is moved by the driving unit 68. As shown in FIG. 6, the diapositive 44 is taken out of the diapositive holder 60, and is set above the light-shielding cylinder 50. The diapositive 44 is for photographing the pre-exposure image 25 relative to each frame 23 of the photographic film 12. When the pre-exposing apparatus 43 is activated, the halogen lamp 55 constituting the lighting unit 51 of the base section 45 is turned on, at the same time, in order to stabilize a light amount. However, the exposure chamber 72 of the exposure section 46 is closed with the shutter 71 so that the photographic film 12 of the film cartridge 14 having been set in the exposure chamber 72 is not exposed carelessly.

As shown in FIG. 1, the film cartridge 14 set in the exposure chamber 72 is held by the cartridge holder 79 constituting the film supplier 75. At this time, the drive shaft 78 engages with the end of the spool 13a of the film cartridge 14. Moreover, the lid operating member 90 disposed opposite the cartridge holder 79 is moved in an axis direction toward the film cartridge 14 so that the engaging pin 91 engages with the light-shielding lid 13b. After that, the sub-controller 83 actuates the rotary solenoid 92 to rotate the engaging pin 91. Thus, the light-shielding lid 13b is opened.

When the light-shielding lid 13b is opened, the sub-controller 83 controls the driver 84 to drive the motor 81 in the film advancing direction. According to this, the drive shaft 78 and the spool 13a engaging therewith are rotated via the clutch 80 so that the photographic film 12 is advanced through the film mouth 20 of the cartridge shell 13.

As to the photographic film 12 advanced from the cartridge shell 13, its leader is retained on the film winding shaft 94 of the film winder 76. The sub-controller 83 controls the driver 96 to drive the motor 95 in the film winding direction. The sub-controller 83 confirms an advancement amount of the photographic film 12 based on the detection signals of the photo sensors 88 and 98. Based on the confirmation, the motor 95 is stopped. The leading side of the photographic film 12, that is, the trailing side regarding the lens-fitted film unit is set at a pre-exposing position. In this embodiment, the five frames 23 are set at the pre-exposing position.

When the frames 23 of the photographic film 12 are set at the pre-exposing position, the sub-controller 74 controls the shutter 71 so as to open and close it. Thereby, the projection light of the positive film 58 set at the diapositive 44 enters the exposure chamber 72 through the magnifying lens 70. At this time, the diapositive 44 is illuminated by the lighting unit 51 via the interference filter 52 and the diffusion plate 53. By the projection light having entered the exposure chamber 72, the corner portions of the five frames 23 of the photographic film 12 are pre-exposed, and the pre-exposure images 25 are photographed there at the same time.

Upon repeating the above operation, the all frames 23 of the photographic film 12 are pre-exposed to the pre-exposure image 25. If the pre-exposure image is tried to be changed in the course of the photographic film, the diapositive 44 being set above the light-shielding cylinder 50 is replaced while the photographic film 12 is advanced to set the next frames at the pre-exposing position.

The photographic film 12, all frames 23 of which have been pre-exposed, is rewound into the cartridge shell 13 by driving the motor 81 in the film rewinding direction. When the whole of the photographic film 12 is rewound into the cartridge shell 13, the sub-controller 83 stops the rotary solenoid 92 of the lid operating member 90. Thus, the rotary solenoid 92 rotates the engaging pin 91 toward the close position of the light-shielding lid 13b by an urging force of a spring which is not shown. Thereby, the light-shielding lid 13b is closed.

The cartridge supplier 73 returns the pre-exposed film cartridge 14 to the cartridge magazine 47, and draws the next film cartridge 14 out of the cartridge magazine 47 to set it on the film supplier 75 disposed in the exposure chamber 72. Of course, the next film cartridge 14 contains an unexposed photographic film 12.

Some of the film cartridges sold at present have a photographable number of fifteen (15), twenty five (25), or forty (40). When the pre-exposure is performed every five frames such as described in the present invention, until the all frames 23 of the photographic film 12 are pre-exposed, it is enough to perform the pre-exposure by three times, five times, or eight times respectively for the above-noted film cartridges. Accordingly, it becomes possible to perform the pre-exposure at a fivefold speed in comparison with the conventional way in which the pre-exposure is performed one frame by one frame.

When all of the film cartridges 14 contained in the cartridge magazine 47 have been pre-exposed, the cartridge magazine 47 is removed from the pre-exposing apparatus 43, and is moved to the manufacturing line of the lens-fitted film unit 2. On the manufacturing line of the lens-fitted film unit 2, while the main body 15 is intermittently conveyed by means of a conveyor belt or the like as well known, each of parts is attached to the main body 15.

In a first step of the manufacturing line, the winding knob 10 and a mechanism for closing the light-shielding lid 13b are respectively attached to the side and the top of the cartridge chamber 32. The light-shielding lid 13b is closed by the closing mechanism when the film cartridge 14 is taken out of the cartridge chamber 32. In a succeeding second step, the exposure unit 16 assembled in another manufacturing line is attached to the front of the light-shielding wall 27 of the main body 15. In a third step, the front cover 17 is attached to the front of the main body 15.

In a fourth step, the film cartridge 14 is inserted from the back of the main body 15. The fourth step is carried out in a dark room. The film cartridge 14 is drawn out of the cartridge magazine 47, and held by a similar device to the film supplier 75 provided in the exposure chamber 72 of the pre-exposing apparatus 43. The light-shielding lid 13b of the film cartridge 14 is opened to advance the photographic film 12 through the film mouth 20. The photographic film 12 is advanced by rotating the spool 13a. The advanced photographic film 12 is wound, in a roll state, on the shaft disposed opposite the film mouth 20. Then, the cartridge shell 13 and the roll-state photographic film 12 are respectively inserted into the cartridge chamber 32 and the film roll chamber 33 from the back of the main body 15.

A fifth step is carried out in the dark room similarly to the fourth step. The rear cover 18 is attached to the back of the main body 15, and the bottom lids 35 and 36 are closed. Thus, the inside of the main body 15 is light-tightly shielded, and then the unit body 3 is completed. The completed unit body 3 is tested relative to its various functions. After that, the label 4 is stuck on a central portion of the unit body 3. The unit body 3 is wrapped by a packaging bag to be sold. The packaging bag has a moisture-proof property. When the photographic film 12 is pre-exposed every plural frames, the film cartridge 14 can be quickly supplied to the manufacturing line of the lens-fitted film unit. Accordingly, the manufacturing efficiency of the lens-fitted film unit 2 is improved.

On the surface of the packaging bag, it is clearly indicated that the contained lens-fitted film unit 2 has been already pre-exposed. In other words, it is clearly indicated that the pre-exposure image 25 including the letters, the mark or the like is taken in the frame 23 of the photographic film 12.

Therefore, it is prevented that the user purchases the pre-exposed lens-fitted film unit by mistake.

The user having purchased the pre-exposed lens-fitted film unit watches through the viewfinder 8 to frame the subject. And then, the user depresses the shutter button 6 to take a photograph. With respect to the viewfinder 8, as shown in FIG. 5, its subject-side window 41 formed at the front cover 17 has a similar figure to the exposure aperture 29 provided with the screen 30. Thus, the user can frame the subject, recognizing that the photograph is not taken on the pre-exposed portion.

When the shutter button 6 is depressed, the shutter mechanism incorporated in the exposure unit 16 is actuated so that the frame 23 of the photographic film 12 is exposed to the subject light via the taking lens 9. The exposure aperture 29 of the lens-fitted film unit 2 is provided with the screen 30 for covering the pre-exposure portion of the photographic film 12 so that the double exposures of the pre-exposure portion are prevented from being performed by the subject light.

In the above-described embodiment, five frames of the photographic film are pre-exposed at the same time. However, the present invention is not exclusive to this. The number of the frames exposed at the same time may be more than or less than five. Further, all frames of the photographic film may be pre-exposed at the same time.

If it is difficult to perform the pre-exposure without distortion and so on when the all frames of the photographic film are pre-exposed, magnifying lenses may be arranged opposite the exposure face of the photographic film. In this case, the pre-exposure is performed for the all frames at the same time by using the magnifying lenses, each of which corresponds to a few frames. Moreover, by using the similar way, it is possible to perform the pre-exposure at the same time for all frames of plural photographic films.

In the above embodiment, the pre-exposure image is photographed on the only corner portion of the frame. However, the pre-exposure image may be photographed on four edges of the frame. Alternatively, the pre-exposure image may be taken on a central portion or one edge of the frame.

Moreover, in the above embodiment, the image used for the pre-exposure is recorded on the diapositive which is adapted to be illuminated, and the photographic film is directly pre-exposed to the projection light of the diapositive. However, the pre-exposure image may be read by a scanner or the like to be stored as digital data. In this case, the photographic film is pre-exposed by a laser beam and so forth based on the digital data. The present invention is applicable to such cases.

Further, the pre-exposure image is formed for all frames of the photographic film. However, the pre-exposure image may be formed for a few frames. As the pre-exposure image, there are an illustration, a letter, a character of a comic book, a portrait of a personality, and so forth. The pre-exposed image may be punched in an outside belt of the lens-fitted film unit. The lens-fitted film unit is sold as a type in which this image is pre-exposed.

Furthermore, in the above-described embodiment, the pre-exposure is performed after the photographic film has been drawn out from the cartridge. However, the pre-exposure may be performed when the photographic film is produced. In this case, the pre-exposed photographic film is wound in the cartridge shell when the film cartridge is manufactured. Thus, it is not necessary to draw out the photographic film from the cartridge shell, and to rewind it into the cartridge shell. Regarding the photographic film, not only IX-240 type but also 135 type may be used.

As to the diapositive, a strip-like positive film may be used. In this positive film, five images, for example, are photographed or are formed in digital recording by means of a laser beam or the like.

As described above, according to the pre-exposing method of the present invention, it is possible to extremely improve its process speed in comparison with the conventional method in which the photographic film is pre-exposed one frame by one frame. Further, as the lens-fitted film unit is loaded with the photographic film which is pre-exposed by the foregoing method, the manufacturing efficiency of the lens-fitted film unit is also improved.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A pre-exposing method for performing a pre-exposure on a strip of film wound inside a cartridge, a predetermined image being photographed in a part of each frame of said photographic film by said pre-exposure, said pre-exposed photographic film being contained in a camera to photograph an image of a subject in a remaining part of said frame, said pre-exposing method comprising the steps of:

advancing said photographic film from said cartridge;

simultaneously pre-exposing N said frames of said strip, where N is an integer greater than 1 and less than a total number of said frames of said strip, said pre-exposing being performed by projecting light through an original image source and a lens to the strip, wherein the strip, lens, and original image source are spatially separated from one another;

alternately moving the strip by N said frames relative to the original image source and repeating the pre-exposing step until all said frames of said strip have been pre-exposed, wherein each iteration of the pre-exposing step pre-exposes a different said predetermined image; and rewinding said pre-exposed photographic film into said cartridge.

2. A pre-exposing method according to claim 1, wherein said pre-exposure is performed with a projection light from a diapositive disposed under said photographic film, said diapositive having N positive images for pre-exposing said N frames simultaneously.

3. A pre-exposure method according to claim 2, wherein said diapositive includes N positive films in which each of said positive images is respectively formed, and a carrier plate for supporting said positive films.

4. A pre-exposing method according to claim 2, wherein said N is five.

5. A pre-exposing method according to claim 2, wherein said projection light from said diapositive is projected to said N frames of said photographic film via a magnifying lens.

6. The method of claim 1, wherein the total number of image frames of the photographic film is an integer multiple of N.

7. The method of claim 1, wherein the pre-exposure step is performed multiple times for each said strip of photographic film, and wherein different said diapositives are used in successive said pre-exposures.

8. The method of claim 6, wherein the pre-exposure step is performed multiple times for each said strip of photographic film, and wherein different said diapositives are used in successive said pre-exposures.

9. A pre-exposing method for performing a pre-exposure on a strip of advanced photographic system (APS) film wound inside a cartridge, a predetermined image being photographed in a part of a frame of said photographic film by said pre-exposure, said pre-exposed photographic film being contained in a camera to photograph an image of a subject in a remaining part of said frame, said pre-exposing method comprising the steps of:

advancing said photographic film from said cartridge;

performing said pre-exposure on said advanced photographic film, said pre-exposure being simultaneously performed relative to N frames of said frames where N is an integer greater than 1, said pre-exposure being performed with a projection light from a diapositive disposed under the photographic film, said diapositive having N positive images for pre-exposing said N frames simultaneously, the projection light from the diapositive being projected to said N frames of said photographic film via a magnifying lens, the diapositive being illuminated via an interference filter and a diffusion plate, the interference filter selectively transmitting a suitable light used for said pre-exposure; and rewinding said pre-exposed photographic film into said cartridge.

10. The method of claim 9, wherein N is less than a total number of image frames of the photographic film.

11. The method of claim 10, wherein the total number of image frames of the photographic film is an integer multiple of N.

12. The method of claim 11, wherein the pre-exposure step is performed multiple times for each said strip of photographic film, and wherein different said diapositives are used in successive said pre-exposures.

13. A pre-exposing method for performing a pre-exposure on a strip of advanced photographic system (APS) film wound inside a cartridge, a predetermined image being photographed in a part of a frame of said photographic film by said pre-exposure, said pre-exposed photographic film being contained in a camera to photograph an image of a subject in a remaining part of said frame, said pre-exposing method comprising the steps of:

advancing said photographic film from said cartridge;

performing said pre-exposure on said advanced photographic film, said pre-exposure being simultaneously performed relative to N frames of said frames, where N is an integer greater than 1, said pre-exposure being performed with a projection light from a diapositive disposed under the photographic film, the diapositive being illuminated via an interference filter, the interference filter selectively transmitting a suitable light used for said pre-exposure; and rewinding said pre-exposed photographic film into said cartridge.

14. The method of claim 13, wherein N is less than a total number of image frames of the photographic film.

15. The method of claim 14, wherein the total number of image frames of the photographic film is an integer multiple of N.

16. The method of claim 15, wherein the pre-exposure step is performed multiple times for each said strip of photographic film, and wherein different said diapositives are used in successive said pre-exposures.

17. A pre-exposing method for performing a pre-exposure on a strip of advanced photographic system (APS) film wound inside a cartridge, a predetermined image being photographed in a part of a frame of said photographic film by said pre-exposure, said pre-exposed photographic film being contained in a camera to photograph an image of a subject in a remaining part of said frame, said pre-exposing method comprising the steps of:

advancing said photographic film from said cartridge;

performing said pre-exposure on said advanced photographic film, said pre-exposure being simultaneously performed relative to N frames of said frames, where N is an integer greater than 1; and rewinding said pre-exposed photographic film into said cartridge;

wherein said pre-exposure is performed with a projection light from a diapositive disposed under said photographic film, said diapositive having N positive images for pre-exposing said N frames simultaneously;

wherein said projection light from said diapositive is projected to said N frames of said photographic film via a magnifying lens; and wherein said diapositive is illuminated via an interference filter and a diffusion plate, said interference filter selectively transmits a suitable light used for said pre-exposure, and said diffusion plate diffuses the light passing through said interference filter in order to illuminate said diapositive uniformly.

18. A pre-exposing method according to claim 17, wherein said interference filter includes two filters having different wavelength ranges.

19. A pre-exposing method according to claim 18, wherein said predetermined image is photographed at a corner of said frame of said photographic film.

* * * * *